Jan. 26, 1943.　　　F. E. ARNDT　　　2,309,087
MATERIAL SPREADER
Filed Feb. 4, 1941　　　2 Sheets-Sheet 1
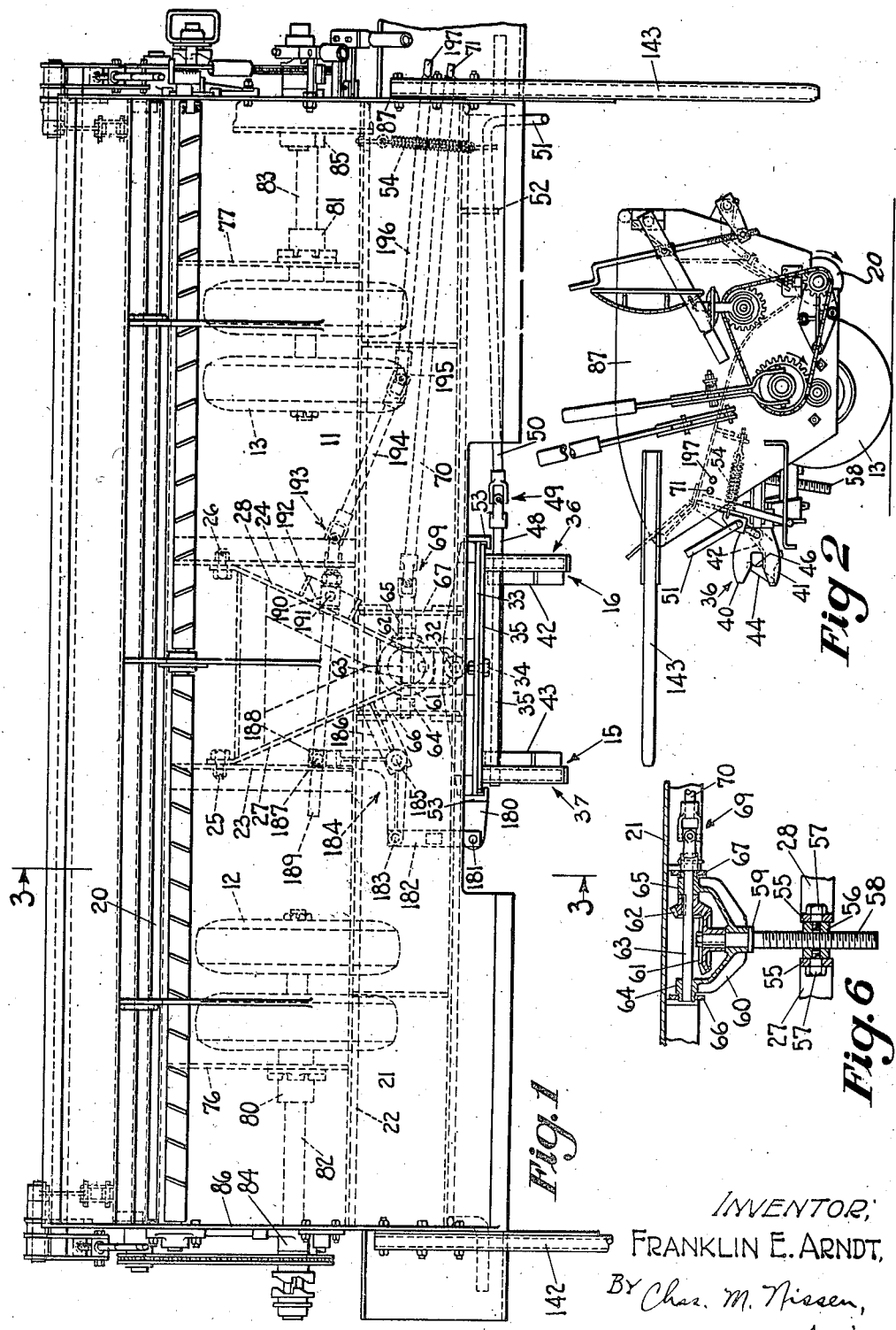
INVENTOR,
FRANKLIN E. ARNDT,
BY Chas. M. Nissen,
ATTY.

Jan. 26, 1943.                F. E. ARNDT                 2,309,087
                         MATERIAL SPREADER
                       Filed Feb. 4, 1941            2 Sheets-Sheet 2
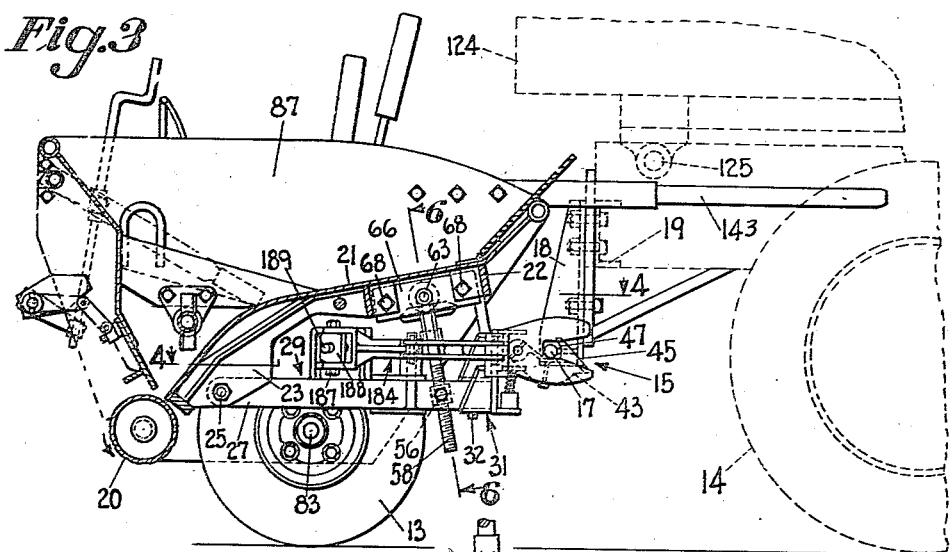
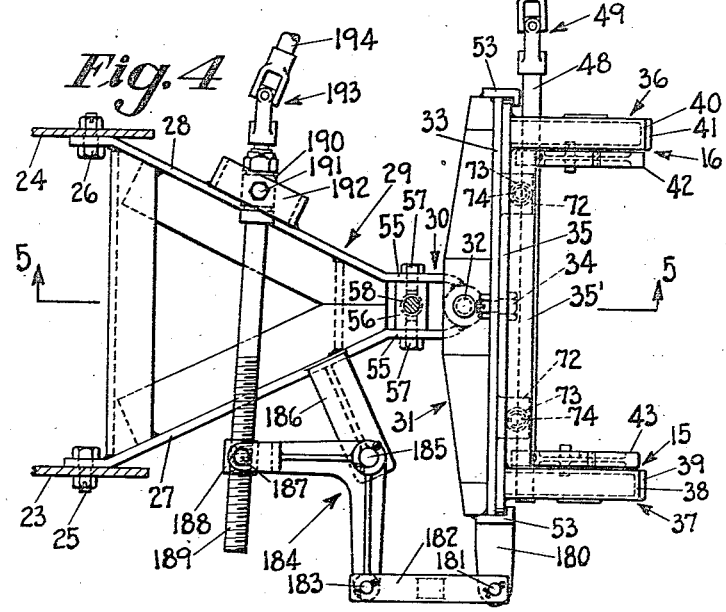
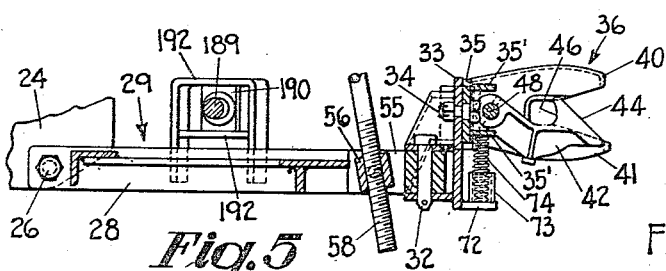
INVENTOR:
FRANKLIN E. ARNDT,
BY Chas. M. Nissen,
             ATTY.

Patented Jan. 26, 1943

2,309,087

UNITED STATES PATENT OFFICE 2,309,087

MATERIAL SPREADER

Franklin E. Arndt, Galion, Ohio, assignor to The Galion Iron Works & Manufacturing Company, a corporation of Ohio Application February 4, 1941, Serial No. 377,350

12 Claims. (Cl. 280—33.44)

My invention relates to road material spreaders of the type which is adapted to be hitched to and hauled behind a dumping truck traveling along the roadway, and one of the objects of the invention is the provision of improved and efficient apparatus hitching a road material spreader to such truck, combined with means for adjusting at will the elevation of the hitching apparatus in accordance with the elevation of the drawbar at the rear end of the towing truck.

Another object of the invention is the provision of means operable from one side of a spreader for adjusting hitching mechanism on an upright pivot relative to supporting framework supported from the bottom of the hopper of the spreader.

Other objects of the invention will appear hereinafter, the novel features and combinations being set forth in the appended claims.

This application is a continuation in part of my co-pending application, Serial No. 131,837, filed March 19, 1937, now Patent No. 2,252,690, granted August 19, 1941, for an improvement in Material spreaders. This application is also a continuation in part of my co-pending application, Serial No. 282,242, filed June 30, 1939, for an improvement in Material spreaders.

In the accompanying drawings,

Fig. 1 is a plan view of the spreader embodying my improvements;

Fig. 2 is an elevational view of the right-hand end of Fig. 1;

Fig. 3 is a cross-section taken on the line 3—3 of Fig. 1 looking in the direction of the arrows;

Fig. 4 is a sectional plan view taken on the line 4—4 of Fig. 3;

Fig. 5 is a sectional view taken on the line 5—5 of Fig. 4 looking in the direction of the arrows; and Fig. 6 is a sectional view taken on the line 6—6 of Fig. 3 looking in the direction of the arrows.

The hopper 11 as shown in Fig. 1 is adapted to extend substantially beyond both sides of the draft vehicle or self-propelled hauling dumping truck shown in dashed lines in Fig. 3. The hopper 11 as shown in Fig. 1 is supported upon the wheels 12, 13 which are set inwardly from the vertical end walls of the hopper so as to track just inside or just outside of the paths of travel of the wheels 14 of the truck shown in dashed lines in Fig. 3. That is to say, when hitching devices 15 and 16 at the front side of the spreader are connected, as shown in Fig. 3, to the drawbar 17 secured by means of the bracket structure 18, 19 to the rear end of the dumping truck, the wheels 12 and 13 of the spreader will travel along paths immediately outside or immediately inside of the paths of travel of the wheels 14 of the dumping truck.

The hopper 11 comprises an open top and an open bottom and below the latter is located the feed roll 20. The bottom wall 21 of the hopper slopes downwardly from the cross-piece 22 to the feed roll 20, as shown in Fig. 3. On the under side of the bottom wall 21 are secured by means of welding, the bracket plates 23, 24 to which are pivoted at 25, 26 the rearwardly extending arms 27, 28 of a triangular frame structure 29. This frame structure may comprise various plates welded together into one rigid unit, as shown in Fig. 4, and includes an apex 30.

A cross-piece 31 is pivoted at 32 to the apex 30 for horizontal swinging adjustment relative thereto on an upright axis. The cross-piece 31 includes a vertical plate 33.

Pivoted at 34 to the center of the upright plate 33 is an auxiliary cross-piece comprising a vertical plate 35 and vertically spaced horizontal plates 35', 35'. The cross-piece 31 constitutes an auxiliary frame relative to the triangular frame 29 and serves as a support for the transverse bar which comprises the plate 35 normally held in parallelism to the plate 33, as more fully explained hereinafter.

Welded to the ends of the plates 35, 35' are the upright jaw devices 36, 37 each having spaced-apart upper and lower fixed jaws. The jaw device 37 comprises the upper jaw 38 and the lower jaw 39, as shown in Fig. 4. The jaw device 36 comprises the upper jaw 40 and the lower jaw 41, as shown in Fig. 5. The jaws 38, 39 and 40, 41 are beveled to facilitate positioning of the drawbar 17, as shown in Fig. 3.

Associated with the jaw devices 36, 37 are beveled latch plates 42, 43, as shown in Fig. 4. The latch plates 42, 43 are beveled at 44, 45, as shown in Figs. 3 and 5. The latch plates are also provided with hooking surfaces 46, 47 in order to hold the drawbar 17 in the locked position shown in Fig. 3.

The latch plates 42, 43 are secured to the rock shaft 48 journaled in openings which extend laterally through the jaw devices 36, 37. As shown in Fig. 1, the rock shaft 48 is connected by means of the universal joint 49 to the actuating rod 50 which is provided with a handle 51 within easy reach of the operator at the right-hand end of the spreader, as shown in Figs. 1 and 2. Secured to the upper front edge portion of the hopper is a bracket plate 52 provided with an opening for receiving the rod 50 so that the latter may have a journal support to co-operate with the universal joint 49 to support the rod 50 in the position shown in Fig. 1.

It can readily be seen by referring to Fig. 5 that when the rod 50 is rotated by means of the handle 51 in a clockwise direction as viewed in Fig. 5, the latch plates 42, 43 will be moved downwardly into positions to release the drawbar 17 (Fig. 3). A spring 54 connected to the handle 51 may be relied on to automatically return the latch plates to locking positions when the handle 51 is released. When the hitching devices are at the proper elevation from the road surface, the spreader may be pushed forward so that the beveled surfaces 44, 45 of the latch plates 42, 43 will engage the drawbar 17, whereupon the latch plates will be automatically depressed against the action of the spring 54 until the drawbar 17 is in the position shown in Fig. 3, whereupon the spring 54 will snap the latch plates into their locking positions.

When the towing vehicle exerts a pull through the drawbar 17 on the hitching devices, the pivot bolt 34 need not take the entire pulling strain as the latter may be distributed between the bolt 34 and the L-shaped guide plates 53, 53 welded to the ends of the crosspiece 31 and extended forwardly and inwardly into positions to form abutment guideways for the ends of the plate 35. In other words, the rigid transverse bar may have its back plate 35 laterally extended to fit into the grooves or guides formed by the inwardly bent plates 53, 53. The rigid structure comprising the jaw devices 36, 37 is pivoted at 34 and guided at its ends by the L-shaped plates 53, 53 which serve as abutments to co-operate with the bolt 34 to distribute the pull exerted from the hitching devices 15, 16.

In order to enable the drawbar 17 to be secured to the rear end of the dumping truck at fixed elevation relative to the road surface and to save the time necessary to adjust the elevation of the drawbar 17 relative to the road surface, I provide means for adjusting the elevations of the hitching devices 15, 16 so as to be in accordance with the elevation of the drawbar on the dumping truck. Between the vertical plates 55, 55 of the apex 30 is located a nut 56. This nut is swiveled between the plates 55, 55 by means of the cap screws 57, 57 shown in Fig. 4.

Threaded through the nut 56 is the upright screw-threaded shaft 58. At the upper end of the screw-threaded portion of the shaft 58 is a collar 59 for supporting the double arm bracket 60. Immediately above the collar 59 the screw-threaded shaft 58 is journaled in the lower end of the bracket 60. To the upper end of the shaft 58 is keyed a bevel gear 61 which meshes with another bevel gear 62 keyed to the shaft 63, the ends of which are journaled in the bearings 64, 65 at the upper end portion of the bracket 60, as shown in Fig. 6.

The upper outer ends of the journal bearings 64, 65 are in turn journaled in openings in the plates 66, 67, as shown in Fig. 6. The plates 66, 67 are rigidly secured to the bottom plate 21 of the hopper and this may be done by means of the bolts 68, 68 as illustrated in Fig. 3.

By means of a universal joint 69 the shaft 63 is connected to the actuating rod 70 which may be extended through an opening in the lateral end wall 87 of the hopper to a squared end 71 which is adapted to fit into a socket wrench or turning tool.

When the spreader is to be hitched to the towing truck, the drawbar 17 may not be in parallelism with the rock shaft 48 but such parallelism may be effected since the transverse bar or plate 35 is pivoted at 34 to the front end of the auxiliary frame 31 on a longitudinal axis, and the auxiliary frame is pivoted at 32 to the frame structure 29 on an upright axis.

Horizontal bracket plates 72, 72 extend forwardly from the lower edges of the vertical plate 33 of the auxiliary frame 31. Cups 73, 73 are secured to the upper sides of the bracket plates 72 to receive the vertical coil springs 74, 74, the upper ends of which bear against the bottom of the lower horizontal plate 35', as shown in Figs. 4 and 5.

When the cross-bar 35 is tilted on the pivot 34, one or the other of the springs 74 is compressed and consequently when hitching is effected with the drawbar 17 and the rock shaft 48 out of parallelism, undue strain will not be transmitted to the frame structure or to the hopper structure. Furthermore the springs 74 always tend to center the cross-bar 35 or hold it in parallelism to the auxiliary frame 31. It should also be noted that when the towing truck travels along the roadway and the drawbar 17 tilts transversely thereof, the springs 74 act as shock absorbers between the rear end of the truck and the hopper structure.

In order to insure proper steering of the spreader when towed by the dumping truck, I have provided mechanism for swinging the auxiliary frame 31 in either direction on the upright pivot 32. For this purpose an extension plate 180 is secured to one end of the auxiliary frame or cross-piece 31 and to the outer end of this plate 180 is pivoted at 181 a link 182, the rear end of which is pivoted at 183 to the bell crank 184, the latter being in turn pivoted at 185 to the outer end of a bracket plate 186 rigidly secured to the triangular frame structure 29, as shown in Fig. 4. The rearwardly extending arm of the bell crank 184 is pivoted at 187 to a nut 188 through which is threaded the screw rod 189 extending across the frame 29 to a journal bearing 190. The latter is pivoted at 191 between bracket plates 192 secured rigidly to the triangular frame structure 29. By means of a universal joint 193, the screw-threaded rod 189 is connected to a link 194 which in turn is connected by the universal joint 195 to the actuating rod 196. The rod 196 extends through an opening in the end wall 87 of the hopper and has a squared end 197 for receiving a socket wrench or turning tool. The squared ends 71 and 197 are adjacent each other and on the same side of the spreader so that the operator may quickly and readily turn either rod 70 to adjust the elevation of the auxiliary frame 31 or turn the rod 196 to swing the auxiliary frame 31 on its pivot 32 relative to the frame 29. The nut and screw mechanism 56, 58 (Fig. 5) is such that it will serve to automatically lock the frame at adjusted elevation relative to the hopper when the turning tool is released from the rod 70. In a similar manner the nut and screw mechanism 188, 189 (Fig. 4) serves to automatically lock the auxiliary frame in rigid connection with the frame 29 when the operator releases the turning tool from the rod 196.

Secured to the under side of the hopper are the bracket plates 76, 77 as shown in Fig. 1. Bolted to the bracket plates 76, 77 are the journal bearings 80, 81 for the inwardly extending supporting wheel shafts 82, 83. The wheels 12 and 13 are keyed to the shafts 82 and 83 to rotate therewith.

The outer ends of the shafts 82, 83 are journaled in bearings 84, 85 which are secured to the end walls 86, 87 of the elongated hopper.

In other words, when the load carrying body 124 is tilted on its pivot 125 (Fig. 3) to dumping position, such body is narrow relative to the transverse length of the hopper.

Handle bars 142 and 143 are connected to the front portions of the end plates 86 and 87 to extend forwardly along opposite sides of the dumping truck, as shown in Fig. 3. Even after hitching has been effected, as shown in Fig. 3, either the screw shaft 58 (Figs. 3 and 5) or the screw shaft 189 (Fig. 4) may be individually rotated.

By referring to Fig. 3 it will be seen that if the hitching mechanism remains at fixed elevation by reason of the drawbar 17 of Fig. 3 being at fixed elevation, operation of the shaft 58 will tilt the hopper and therefore vary the elevation of the feed roll 20. However, the main purpose of the mechanism for adjusting the elevation of the hitching mechanism is to accommodate the latter to whatever height the drawbar of the towing truck may have, and in this way maintain the upper side of the hopper approximately horizontal for maximum capacity when receiving material from the dumping truck.

The main purpose of the mechanism for adjusting the auxiliary frame 31 on the vertical pivot 32 is to assure proper steering of the spreader when towed by the dumping truck. The drawbar 17 may not be mounted on the rear end of the truck frame exactly at right angles to the path of travel of the towing truck and this will result in a greater pulling strain being exerted on one of the hitching devices 15 or 16 than on the other. In order to equalize the pulling strains or distribute them between the two hitching devices 15 and 16, the screw rod 189 should be adjusted by applying the turning tool to the squared head 197 until the wheels 12 and 13 of the spreader travel along lines which are parallel to the tracking of the wheels 14 of the dumping truck provided the roadway is level. However, where spreading is to be performed on crowned roadways, there is a tendency for the spreader to skid toward that lower side of the roadway along which the spreader is towed. To counteract this tendency to skid, the auxiliary frame 31 may be adjusted on the pivot 32 in such a direction as to cause the wheels 12, 13 of the spreader to tend to steer the spreader toward the center of the roadway. Such adjustment will effect an equalization of the pulling strains by the drawbar 17 on the hitching devices 15 and 16 and at the same time counteract the tendencies of the spreader to skid toward the lower side of the roadway. For instance, if the spreader is traveling along the right hand side of the roadway and due to the crowning the slope is toward the right-hand side, the auxiliary frame 31 should be adjusted in a clockwise direction as viewed in Fig. 4 so that the spreader will be skewed rearwardly toward the lower side of the roadway thereby placing the wheels 12 slightly ahead of the wheels 13 relative to the drawbar 17, assuming the latter to be exactly at right angles to the path of travel of the truck. In such event the spreader will be continually steered toward the center of the roadway and this will distribute the pull by the drawbar 17 equally on the hitching devices 15 and 16.

The valve plate or feed gate associated with the feed roll and the mechanism for operating the same as shown in Fig. 3 are disclosed and claimed in my co-pending application, S. N. 380,681, filed February 26, 1940, for an improvement in Material spreaders.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A material spreader comprising the combination with a frame adapted to be pivotally connected to a spreader on a horizontal transverse axis, of a transverse bar pivoted to the forward end of said frame on an upright axis, a parallel transverse bar pivoted to said first-named transverse bar on an axis extending longitudinally of the roadway when the spreader is in operating position, mechanism on said parallel transverse bar for coupling a drawbar of a towing vehicle to said bars and said frame, and means connected to said frame and adapted to be connected to said spreader to adjust the elevation of the forward end of said frame together with said bars on the aforesaid horizontal transverse axis and thereby adjust the elevation of said coupling mechanism in accordance with the elevation of said drawbar.

2. A material spreader comprising the combination with a hopper, of mechanism to support the same for travel along a roadway, a frame mounted under said hopper for adjustment in elevation relative thereto, means carried by the hopper and connected to said frame to effect adjustment in elevation of the forward end of said frame, a transverse bar pivoted to said frame on an upright axis, hitching mechanism pivoted to said transverse bar on a longitudinal axis, and means for swinging said transverse bar together with said hitching mechanism on said upright axis.

3. A material spreader comprising the combination with a frame adapted to be connected to a spreader, of a cross-piece pivoted on an upright axis to the forward end of said frame, a transverse bar pivoted to said cross-piece on a longitudinal axis, centering mechanism comprising spaced apart springs between said cross-piece and said transverse bar to hold the same yieldingly in parallelism, hitching mechanism connected to said bar, and means mounted on said frame and connected to said cross-piece to swing the same on said upright axis to effect adjustment of said hitching mechanism relative to said frame.

4. A material spreader comprising the combination with a frame adapted to be connected to a spreader for adjustment in elevation relative thereto, a cross-piece pivoted to said frame on an upright axis, a transverse bar pivoted to said cross-piece on a longitudinal axis, extensions from said cross-piece to the front side of said transverse bar, and coupling mechanism carried by said transverse bar and movable up and down therewith, the construction and arrangement being such that the pull of a towing vehicle is distributed to said cross-piece between the longitudinal pivot and said extensions over a limited range of tilting movement of said transverse bar relatively to said cross-piece.

5. A material spreader comprising the combination with a hopper, of means for supporting said hopper for travel on a roadway, a triangular frame pivotally connected to the under side of the hopper on a horizontal axis, mechanism connected between the bottom of the hopper and the apex of the triangular frame for adjusting the elevation of such apex relative to the hopper, a transverse bar pivotally connected to said apex on an upright axis, coupling mechanism on said transverse bar for connection to a drawbar of a towing vehicle, and mechanism between said frame and said transverse bar for adjusting the latter on said upright axis.

6. A material spreader comprising the combination with a frame, of a cross-piece pivoted to said frame on an upright axis, a cross-bar pivoted to said cross-piece on a longitudinal axis, mechanism for swinging said cross-piece on said upright axis, hitching mechanism on said cross-bar, and means acting on said frame to effect adjustment in elevation of said cross-piece and said cross-bar together with the hitching mechanism mounted on the latter.

7. A material spreader comprising the combination with a frame adapted to be pivotally connected to a spreader on a horizontal transverse axis, of a transverse bar pivoted to said frame on an upright axis, a parallel transverse bar pivoted to said first-named transverse bar on an axis extending longitudinally of the roadway when the spreader is in operating position, mechanism on said parallel transverse bar for coupling a towing vehicle to said bars and said frame, and means between said frame and said first-named bar for adjusting said bars on said upright axis to secure adjustment of said coupling mechanism.

8. A material spreader comprising the combination with a hopper, of mechanism to support the same for travel along a roadway, a frame connected to said hopper so as to be confined against lateral movement relatively thereto, a transverse bar pivoted to said frame on an upright axis, hitching mechanism pivoted to said transverse bar on a longitudinal axis, and means for swinging said transverse bar together with said hitching mechanism on said upright axis.

9. A material spreader comprising a frame adapted to be pivotally connected to a spreader on a horizontal axis, a transverse bar connected to said frame on an upright axis, a parallel transverse bar pivoted to said first-named transverse bar on a longitudinal axis, said bars having a relatively sliding fit against each other, spaced-apart resilient devices associated with the second-named bar and one spaced from one side of said longitudinal axis and the other spaced from the other side of said axis, said resilient devices serving to yieldingly limit the relative movements between said bars, and hitching mechanism connected to said parallel transverse bar.

10. A material spreader comprising the combination with a frame adapted to be pivotally connected to the hopper of the spreader, of a cross-piece pivoted on an upright axis to the forward end of said frame, a transverse bar pivoted to said cross-piece on a longitudinal axis, centering mechanism between said cross-piece and said transverse bar to hold the same yieldingly in parallelism, hitching mechanism connected to said bar, means for swinging said cross-piece together with said transverse bar on said upright axis to effect adjustment of said hitching mechanism relative to said frame, and means for swinging said frame on its pivotal connection to the hopper to adjust the hitching mechanism relative to said hopper.

11. A material spreader comprising the combination with a frame, of a horizontal cross-piece pivoted to said frame on an upright axis, hitching mechanism connected to end portions of said cross-piece for support thereby, a bell-crank mounted on said frame, a link connecting one arm of said bell-crank to one end of said cross-piece, and means comprising nut and screw mechanism for actuating said bell crank to secure adjustment of said cross-piece and said hitching mechanism on said upright axis.

12. A material spreader comprising the combination with a hopper, of a frame pivoted to the bottom of said hopper so as to be confined against lateral movement relatively to said hopper, the forward end of said frame being adjustable in elevation, mechanism connected to said frame to adjust the elevation of the forward end of said frame relative to said hopper and lock the frame at such adjusted elevation, a transverse bar pivoted to said frame on an upright axis, spaced-apart hitching devices mounted on said transverse bar, mechanism between said frame and said transverse bar to adjust the latter on said upright axis together with said hitching devices, and means individual to said adjusting mechanisms for operation of the same from one of the lateral ends of the spreader, said adjusting mechanisms being extended to such lateral end of the spreader from the location of said frame intermediate the lateral ends of the hopper.

FRANKLIN E. ARNDT.